Oct. 22, 1963　　R. A. LANDRUM, JR., ETAL　　3,108,250
SEISMIC RECORD SYNTHESIS
Filed June 29, 1960　　　　　　　　　　　　　2 Sheets-Sheet 2

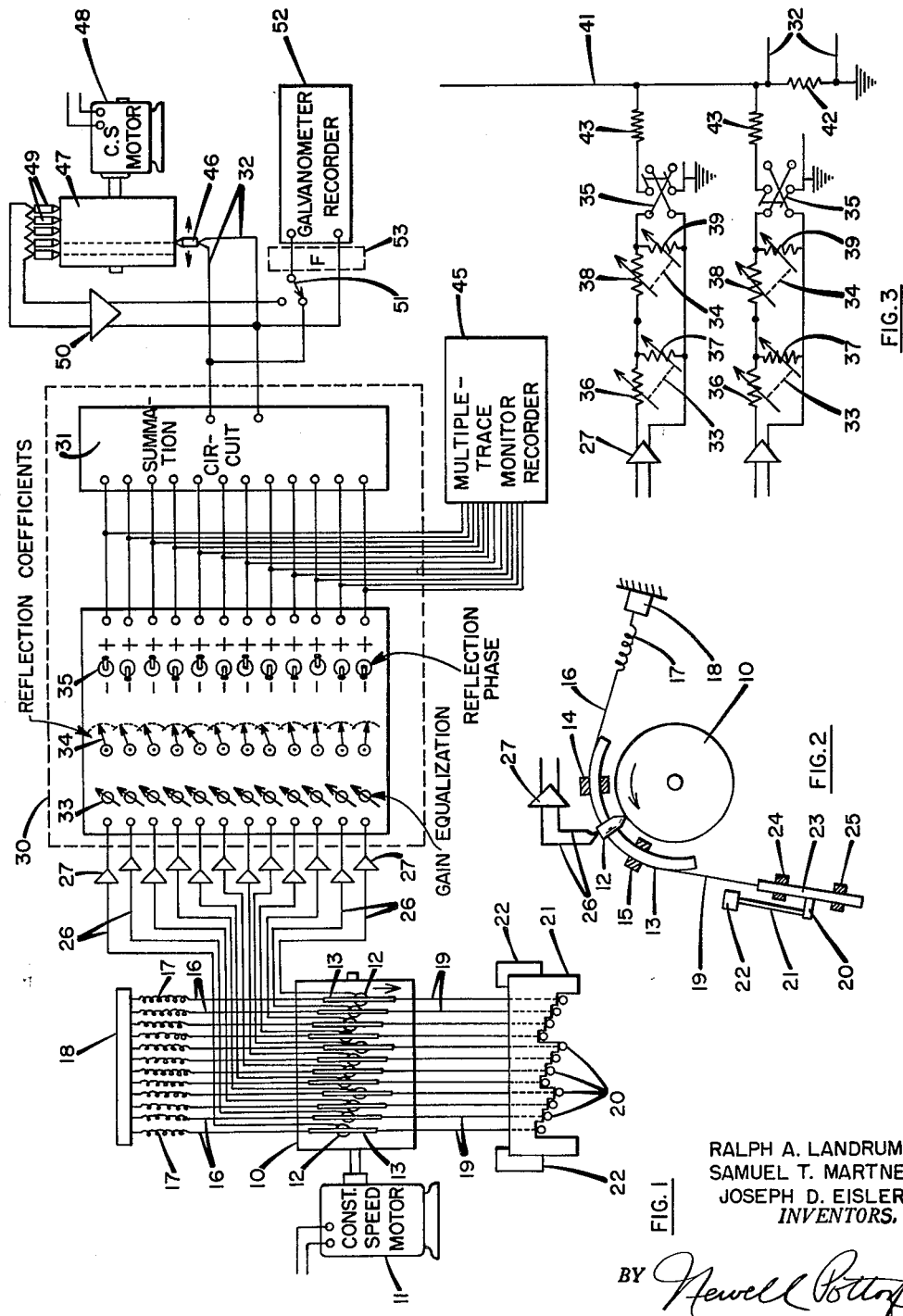

RALPH A. LANDRUM, JR.
SAMUEL T. MARTNER
JOSEPH D. EISLER
*INVENTORS.*

BY *Newell Potter*

*ATTORNEY*

# 3,108,250
SEISMIC RECORD SYNTHESIS
Ralph A. Landrum, Jr., Samuel T. Martner, and Joseph D. Eisler, Tulsa, Okla., assignors to Pan American Petroleum Corporation, Tulsa, Okla., a corporation of Delaware
Filed June 29, 1960, Ser. No. 39,711
5 Claims. (Cl. 340—15.5)

This invention relates to seismic geophysical surveying and is directed particularly to the making of synthetic seismic records. More particularly, the invention is directed to a novel method and apparatus for making synthetic seismic-record traces, utilizing to a maximum extent certain types of existing magnetic-record playback equipment.

In geophysical exploration for subsurface minerals, particularly for oil and gas, the seismic method of exploration has for a considerable number of years been recognized as providing the most detailed information. It has long been a general practice to transmit and receive artificially created seismic waves between two points at or near the earth's surface and utilize the arrival times of certain ones of the received waves to obtain information about the various wave paths. Considerably less use has been made of other characteristics of the received waves, such as their relative amplitudes, wave forms, or phases. Nevertheless, it has been generally recognized that these aspects of the received waves, in addition to their arrival times, contain valuable information about the earth's subsurface formations.

More recently, efforts have been made to correlate minor features of the received wave forms with the subsurface lithology, so as to detect changes in the lithology by observing changes in the received wave forms. Of very great assistance in this regard has been the recent availability, in increasing numbers, of continuous velocity logs. These are made by traversing through a well bore an emitter and receiver of sonic impulses spaced a fixed distance apart. With the aid of analytical instruments or by interpretation a log is produced of the seismic wave-transmission velocities of the various formations as a function of depth in the well. Given such a log, it has become possible to predict the wave forms and arrival times of reflected seismic waves occurring when the logged strata are traversed by a given seismic-wave impulse.

Such predicted seismic wave forms have been simply designated synthetic seismic traces, or a number of such forms side by side have been called synthetic records. Their chief utility comes from comparing them with a conventionally recorded seismic field record obtained in the vicinity of the logged well. Correspondence between the synthetic and the field-record traces is accepted as good evidence that the subsurface lithology at the field-record location corresponds with the subsurface conditions measured in the well by the continuous velocity log. Changes that may be made when producing the synthetic record, to improve its correspondence to the field-record trace, are likewise suggestive of corresponding changes in the actual earth's subsurface.

The methods and apparatus for transforming a continuous velocity well log into a corresponding synthetic seismic-record trace are frequently somewhat costly to build and use, or involve a substantial amount of time in preparing the synthetic records. Accordingly, the use of synthetic record traces may often be limited by the fact that they are somewhat expensive to prepare. On the other hand, if it were simple, easy, and inexpensive to prepare such traces, it is likely that they could receive much more general use than at present in the interpretation of complex seismic-record wave forms.

In view of the foregoing, it is a primary object of our invention to provide, for making synthetic seismic-record traces, a novel and improved method and apparatus which is rapid and inexpensive to use. It is a further object of the invention to utilize to a maximum degree existing magnetic playback equipment for the production of synthetic seismic-record traces. A further object is to provide auxiliary apparatus for use with conventional forms of magnetic record playback equipment, so as to simplify and expedite the preparation of synthetic seismic-record traces. Other and further objects, uses, and advantages of the invention will become apparent as the description proceeds.

Briefly stated, our invention relies upon the fact that there has become widely available in recent years multiple-trace seismic magnetic-record playback equipment, with provision for shifting the various magnetic playback heads along the magnetic traces with respect to each other so as to compensate for different travel times of corresponding waves on the different traces. Since synthetic seismic traces can generally be regarded as the superposition pattern of a plurality of individual wavelets of similar form, with varying spacing in time and various amplitudes and signs or phases, this head-shifting capability of the magnetic reproducer is utilized by our invention to provide the spacing in time of the various impulses. Preferably, the various impulses are provided by recording, on a multiple-trace magnetic tape, a group of impulses or wave forms aligned at identical times across a group of adjacent traces. By scanning this aligned group of impulses, with the various magnetic heads of the different record tracks shifted to various positions by the head-shifting mechanism in accordance with assumed or measured two-way travel times of reflections as determined from an assumed or measured continuous velocity log, a succession of impulses with the desired time spacing is thereby generated. By an auxiliary unit, the amplitude of each impulse is adjusted in accordance with the reflection coefficient of the corresponding subsurface boundary; and the phase or sign of the reflection, as determined by the direction of travel and by the strata on either side of the boundary, is established for each impulse. All of the impulses so generated, modified, and phased with respect to each other are then summed into a single waveform, which is recorded as the synthetic seismic-record trace or portion thereof due to the particular interfaces being modeled.

By utilizing in various ways, as will be described in more detail later, the storage mechanism that is frequently a part of the magnetic playback equipment, a given group of interfaces can be modeled, and the resultant portion of the synthetic seismic trace placed in storage. Subsequently, a different group of interfaces can likewise be modeled and placed in storage. When all of the interfaces that it is desired to utilize have been thus introduced, the stored traces are played back simultaneously, and a final resultant trace is produced representing the entire desired synthetic seismic trace. Alternatively, by using as the seismic input impulse different wavelet forms or pulse shapes, or by modifying simple pulses by the action of filters, the effect of this variable on the resulting synthetic seismic record trace can also be investigated. This is an important feature for the reason that the correspondence between a field record and a synthetic trace can often be markedly improved by varying the assumed form of the seismic impulse.

The foregoing will be better understood by reference to the accompanying drawings forming a part of this application and showing certain modifications and embodiments of the invention. In these drawings, FIGURE 1 is a schematic wiring diagram of a complete system for producing synthetic seismic-record traces in accordance with the invention;

FIGURE 2 is a diagrammatic cross-section view of a portion of the apparatus of FIGURE 1;

FIGURE 3 is a wiring diagram of portions of the apparatus of FIGURE 1;

Figure 4:
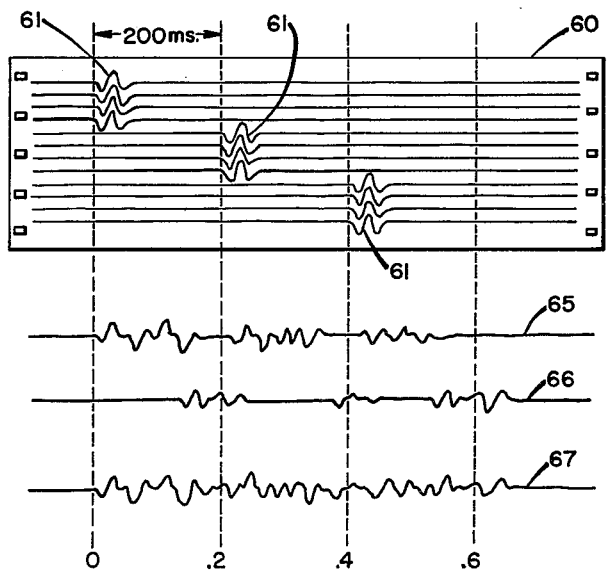
FIGURE 4 shows a record and resulting seismic traces made according to one modification of the invention.

Referring now to the drawings in detail, and particularly to FIGURES 1 and 2 thereof, in these figures is shown diagrammatically a conventional multiple-trace magnetic playback system comprising a drum 10 rotated by a constant-speed motor 11 adjacent an array of magnetic reproducing heads 12 mounted on individually adjustable shifting and mounting members 13. As is best shown in FIGURE 2, the head-carrying mounting 13 is preferably curved to be concentric with the surface of drum 10 and to be slidable lengthwise in the fixed supports 14 and 15 in the direction of the record-time dimension. The head-mounting member 13 is urged in one direction by a cord or wire 16, pulled by a tension spring 17, anchored to a fixed support 18. The head 12 and mounting member 13 are urged in the opposite direction by a cord or wire 19 connected to a pin 20, which is contacted and positioned against the pull of the spring 17 by a delay card 21, supported in a fixed holder 22. Preferably, the pin 20 is mounted on a sliding bar 23, movable lengthwise through a pair of bearing supports 24 and 25. By a pair of insulated leads 26, the coil of reproducing magnetic head 12 is connected to an amplifier 27.

All of the elements so far described will be understood to constitute, in one form or another which may differ from that illustrated in detail, the elements of a conventional multiple-trace seismic magnetic record-reproducing system. Thus, in the operation of reproducing seismic records, a magnetic-tape record is placed on the surface of the drum 10 to be moved thereby underneath the array of heads 12. Each of the heads 12 is positioned at a place along the length of the corresponding trace relative to the other heads in accordance with the positions of the various pins 20, as determined by the shape of the delay card 21. The edge of this card is formed in a known way by a mechanically adjustable cutter in accordance with the predetermined corrections computed to be necessary for various recorded traces.

For illustrative purposes only, it is assumed that the reproducing drum 10 is capable of reproducing simultaneously twelve traces of recorded information, each independent of all the others. It will be understood, however, that the number of traces available for simultaneous independent reproduction in most playback systems is usually much larger than this, being for example from 24 to 50, or even more.

Cooperating with the apparatus so far described is a control unit contained within the dashed line 30. Basically the unit 30 includes twelve separate channels of attenuation or adjustment followed by a summation circuit 31 which produces on the leads 32 an output signal that is the sum of all of the input signals modified by the adjustment of the various units of the device 30. Thus, the unit 30 preferably includes twelve independent gain-equalizing means 33, twelve independent reflection-coefficient-adjusting means 34, and twelve independent reflection sign-determining means 35.

FIGURE 3 shows two of the twelve parallel units of the device 30 in some detail. Thus, the gain-equalization member 33 may comprise an attenuator made up of the adjustable resistors 36 and 37 respectively in series and shunt across the signal channel, while the reflection-coefficient-adjusting member 34 is similarly an attenuator made up of the series resistance 38 and shunt resistance 39, suitably adjustable by a single control. The reflection sign-determining means 35 may comprise simply a double-pole, double-throw reversing switch, as shown in FIGURE 3. The summation circuit 31 may simply comprise a conductor 41 extending through a resistance 42 to electrical ground, each of the separate adjusting channels being connected through a series resistance 43 to the common conductor 41. The voltage drop appearing across the resistance 42 is the signal appearing on the summation circuit output leads 32.

While not essential, it is desirable that each of the separate input signals entering the summation circuit 31 be recorded as a visible trace by a multiple-trace monitor recorder 45, which is of assistance in adjusting and equalizing the different channels of the playback apparatus.

The summation circuit output leads 32 extend to a magnetic-recording head 46 adjacent a magnetic storage drum 47, rotated by a constant-speed motor 48. The recording head 46 is movable to various trace-recording positions in sequence along the surface of the drum 47. Spaced around the drum 47 from the head 46 is an array of reproducing heads 49, connected in series and reproducing the stored traces on the drum 47. The combined output of the heads 49 is passed to an amplifier 50 and thence to one fixed contact of a selector switch 51 having its movable arm connected to a galvanometer recorder 52. Preferably also, the output leads 32 of summation circuit 31 are directly connectable to the gavanometer recorder 52 by another position on the selector switch 51. Also, there may be interposed between the switch 51 and the galvanometer 52 a filter circuit 53 of any desired type, such as an adjustable filter of the type used in seismic amplifiers.

The way in which this equipment operates to perform our invention will now be explained by referring to an assumed example as set forth in Table I, and with reference to FIGURES 4 and 5 of the drawings. For this example, it will be assumed that the maximum movement of the head carrier 13 by means of the delay card 20 corresponds to 200 milli-seconds of seismic-record time. In other words, this range of 200 milli-seconds is the maximum time difference that can be introduced between any two of the twelve traces on the drum 10 by shifting of the heads 12.

*Table I*

| Two-way time from CVL in ms. | Reflection | | Two-way Time Minus Group Delay | First Synthetic Trace | | | | Second Synthetic Trace | | | |
|---|---|---|---|---|---|---|---|---|---|---|---|
| | Coeff. | Sign | | Trace No. | Delay Card | Refl. Coeff. | Sign | Trace No. | Delay Card | Refl. Coeff. | Sign |
| 10 | .2 | + | 10 | 1 | 10 | .2 | + | | | | |
| 44 | .3 | − | 44 | 2 | 44 | .3 | − | | | | |
| 90 | .3 | + | 90 | 3 | 90 | .3 | + | | | | |
| 125 | .2 | − | 125 | 4 | 125 | .2 | − | | | | |
| 160 | .15 | + | 160 | | | | | 1 | 160 | .15 | + |
| 188 | .12 | − | 188 | | | | | 2 | 188 | .12 | − |
| 215 | .4 | + | 15 | 5 | 15 | .4 | + | 3 | 0 | 0 | |
| 244 | .3 | − | 44 | 6 | 44 | .3 | − | 4 | 0 | 0 | |
| 282 | .25 | + | 82 | 7 | 82 | .25 | + | | | | |
| 314 | .3 | − | 114 | 8 | 114 | .3 | − | | | | |
| 377 | .2 | + | 177 | | | | | 5 | 177 | .2 | + |
| 391 | .1 | + | 191 | | | | | 6 | 191 | .1 | + |
| 422 | .25 | − | 22 | 9 | 22 | .25 | − | 7 | 0 | 0 | |
| 468 | .2 | + | 68 | 10 | 68 | .2 | + | 8 | 0 | 0 | |
| 492 | .15 | − | 92 | 11 | 92 | .15 | − | | | | |
| 517 | .1 | − | 117 | 12 | 117 | .1 | − | | | | |
| 556 | .2 | + | 156 | | | | | 9 | 156 | .2 | + |
| 593 | .3 | − | 193 | | | | | 10 | 193 | .3 | − |
| | | | | | | | | 11 | 0 | 0 | |
| | | | | | | | | 12 | 0 | 0 | |

In the assumed example shown by Table I, the first column of the table corresponds in milliseconds to the two-way travel times from the ground surface to each of a series of subsurface interfaces, as established by depth of measurement and velocity integration with respect to time on a continuous velocity log. In the second column of the table are shown the reflection coefficient and the sign of the reflection produced by each corresponding interface whose two-way travel time from the ground surface is given in the first column. To a first approximation, as is well known, the numerical reflection coefficient may be simply one half the incremental change in the value of the logarithm of the seismic-wave velocity occurring upon crossing the corresponding boundary of the first column. The sign of the reflection is, of course, determined by whether the acoustic impedance or velocity increases or decreases in the downward direction across the boundary in question. If the acoustic impedance or velocity increases, in general the sign of the reflection will be positive while, if it decreases, it will be negative. Thus, the first two columns of this table contain the essential reflection data as derived from the continuous velocity log, or as assumed for purposes of making a comparison trace on a trial and error basis.

This table is to be considered with reference to the record 60 of FIGURE 4. The record 60 is a diagrammatic illustration of the magnetic-trace record which is to be placed on the drum 10 and scanned by the array of heads 12. Thus, the twelve traces may be considered as divisible into three groups of four traces each. On each of the first four traces of the record 60, is recorded in alignment an assumed wavelet form 61. On the next four traces of record 60, the same wavelet form 61 is recorded after a delay of 200 milliseconds with respect of its time on the first four traces. Likewise, on the last four traces of record 60, the pulse form 61 is recorded with an additional delay of 200 milliseconds over that for the middle four traces. It will be understood that the showing of FIGURE 4 is diagrammatic in the respect that the signals magnetically recorded on the magnetic record are not ordinarily visible, as are the wiggly-line traces of the record 60.

With such an arrangement of pre-recorded traces, it will be apparent that by utilizing the delay card 21 and the head-shifting mechanism associated therewith, any of the impulses 61 on the first four traces of the record 60 can be shifted anywhere within the first 200-millisecond interval. By the same mechanism, any one of the second group of four impulses can be shifted to any point in the second 200-millisecond interval of the record 60, and likewise any impulse of the third group can be placed anywhere within the third 200-millisecond record interval. Thus, at least one of the impulses 61 of the pre-recorded record 60 can be placed anywhere within a time range of 600 milliseconds.

In general, the range of time which can be accommodated in making synthetic records is equal to the static adjustment range of the head-shifting mechanism, in this case 200 milliseconds, times the number of groups of impulses used, in this case three groups. Obviously, any desired record length can be accommodated by providing a sufficient number of groups of the impulses 61, although, as will be subsequently explained, by utilizing the normally available storage facilities of the magnetic reproducing equipment, even a limited number of available groups can approximate any desired length of seismic synthetic record.

Referring again to the table, it may be noted that in each 200-millisecond interval of record time there are six reflecting interfaces. Thus, the first six interfaces can be modeled by the first four reproducing heads 12 and the upper four traces of the record 60. Likewise, the second group of six interfaces falling between 200 and 400 milliseconds of record time can be modeled by the middle group of heads and traces; and similarly the six reflecting interfaces falling between 400 and 600 milliseconds, can be modeled by the last four heads and bottom four traces of the record 60.

In the third column of the table, allowance has been made for the time spacing between the three groups of aligned pulses on the record 60. Since the middle and last groups of four pulses are respectively 200 and 400 milliseconds displaced in time relative to the first group, 200 milliseconds have been deducted from the two-way travel times of the six reflecting interfaces to be modeled by the middle group of heads and traces, and 400 milliseconds have been subtracted from the last six interface times which are to be modeled by the last four heads and bottom four traces of the record 60. Accordingly, in the third column, entitled "Two-way Time Minus Group Delay" are shown the delay times to be cut into the edge of the delay card 21 in order to reproduce the various pulses at the proper record times by the heads and traces to which they are assigned.

The next four columns of the table show under heading "First Synthetic Trace" the particular delay card settings, reflection coefficients and signs employed in modeling twelve of the eighteen interfaces to be combined. Trace 65 of FIGURE 4 represents the form of this twelve-reflection trace as it would be recorded by means of the galvanometer recorder 52, if it is desired to record this trace separately. In making the complete synthetic trace, however, this trace is preferably stored by means of the magnetic recording head 46 on the magnetic storage drum 47 rotated by the motor 48.

The next four columns of the table show the data for the second synthetic trace corresponding to that for the first, where it will be seen that this contains the settings of the instrument for the remaining six interfaces which were not modeled in the first synthetic trace. Trace 66 of FIGURE 4 represents this second synthetic trace as it would be recorded by the recorder 52, if desired, but which trace is preferably also stored on an unused trace position of the storage drum 47 by the head 46. Upon then moving selector switch 51 to the upper contact position, while rotating the drum 47 and playing back through the amplifier 50, the summation of the two stored traces 65 and 66 by the array of pick-up heads 49 is then recorded by the galvanometer recorder 52 as the final trace 67. This is exactly the trace which would be produced if all of the eighteen interfaces could be modeled by a single pass through the equipment.

In this simple illustrated model providing storage for five traces, it will be apparent that a maximum of 60 interfaces in 600 milliseconds of record time can be rapidly and expeditiously modeled. From this example, it will be apparent how a much greater number of interfaces and/or a substantially greater length of record time can be modeled by a playback apparatus by providing a larger number of traces of simultaneous reproduction, a larger number of storage-trace positions, and/or different groupings and spacings of the pre-recorded traces 61 on the record 60. Thus, by addition of the relatively simple unit 30 and use of the pre-recorded record 60 in conjunction with the conventional seismic magnetic-record playback equipment, a highly flexible system of producing synthetic seismic record traces is provided.

Figure 5:
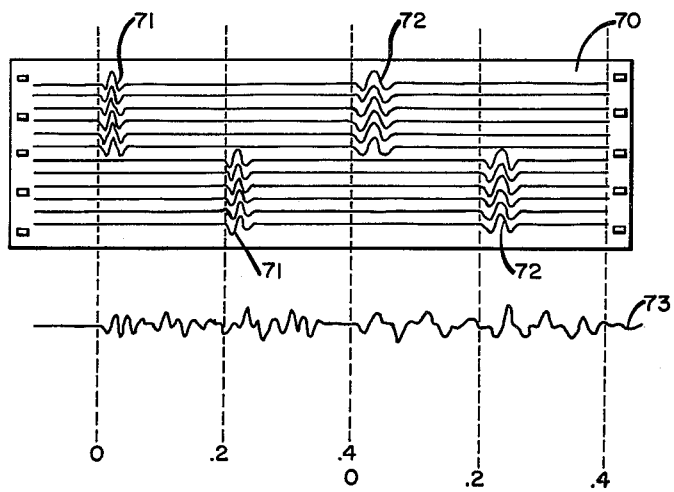
FIGURE 5 shows a record and resultant seismic synthetic trace according to another modification of the invention.

In FIGURE 5 is illustrated, by a somewhat different pre-recorded record 70, a different way of utilizing the apparatus of the invention together with playback equipment to provide synthetic seismic record traces of somewhat different form. Thus, the pre-recorded record 70 bears two groups each of six pre-recorded aligned impulses 71 separated by 200 milliseconds of record time. The upper six traces at 400 milliseconds of record time contain a group of aligned pre-recorded pulses 72, which are duplicated after an additional 200 milliseconds on the bottom six traces of the record 70. The wave forms of the respective impulses 71 and 72 are different for the specific purpose of investigating the effect of changes in pulse form on the resulting synthetic seismic trace. It is frequently observed that the matching of field traces and synthetic seismic-record traces can be markedly improved by varying the form of the impulse used in making the synthetic trace.

The trace 73 represents the form of synthetic trace which might be obtained by utilizing the two-way travel times of Table I of about the first ten interfaces listed in that table. Thus, the delay card prepared for playing back the record 70 will apply the first six travel times as six corresponding delays to the first six heads of the playback apparatus reproducing the upper six traces of the record 70. Since the delay times for the pulses 71 and 72 on these upper six traces are the same regardless of the impulse wave form, the same relative-delay card is applicable in reproducing the entire length of the record 70. The next four interfaces can be reproduced by correspondingly forming the edge of the weathering card 21 for the next four heads and traces. The last two interfaces in the 200- to 400-millisecond interval have been omitted for the reason that their delay times could be such as to cause them to overlap the beginning of the reproduction of the first impulse 72 on the upper traces.

The resulting trace 73, as it would be recorded by recorder 52, is thus composed of two sections, the first extending from 0 to 400 milliseconds, and the second extending from 400 to 800 milliseconds. It will be understood, however, that the zero time for the second trace section falls at 400 milliseconds since both of two sections represent the same group of interfaces as modeled by using synthetic impulses 71 and 72 of different forms.

Here again it will be evident how, by utilizing a great number of playback heads, recorded traces, and different arrangements of pulse groups a larger number of different forms of the input pulses 71, 82, and the like can be simultaneously investigated. Likewise, the effect of different filters 53 can be investigated by changing the filter setting between different reproductions of the same group of stored traces through the amplifier 50.

The use of different filters constitutes a further way, alternative to that of FIGURE 5, for investigating the effect of different wavelet forms, for the final result is the same if the pre-recorded impulses 61, 71 and 72 are simple spike or block wave-forms, which are converted to wavelets by filters, or if they are the relatively complex wavelets shown in the drawings. Thus, the effect of filter 53 could include this conversion as well as the action of conventional seismic filters.

It will be apparent that by the foregoing apparatus and form of pre-recorded recordings, a wide variety of synthetic seismic record traces, to simulate a wide variety of subsurface seismic surveying conditions, can be investigated readily and inexpensively. In view of the foregoing embodiment and examples, it will be apparent that a great many other and further modifications may be made within the spirit of the invention. The invention should not be considered as limited to the details set forth, but its scope is preferably to be ascertained from the appended claims.

We claim:

1. The method of making a synthetic seismic record trace in accordance with measured or assumed reflection coefficients and two-way travel times for a succession of earth subsurface seismic-wave-reflecting interfaces, which method comprises shifting each of a plurality of shiftable magnetic heads of a multiple-trace magnetic reproducer to one of a correspoding plurality of time-delay positions matching a similar plurality of two-way travel times to successive interfaces, scanning past said heads a plurality of pre-recorded magnetic traces bearing an assumed seismic impulse perpendicularly aligned across said traces, modifying the output amplitude and the phase of each of said head outputs in accordance with the corresponding interface reflection coefficient and sign, combining the modified outputs of said heads into a single electrical signal, and oscillographically recording said signal as a function of a record time.

2. The method of making a synthetic seismic record trace utilizing measured or assumed continuous velocity log data to establish the two-way seismic reflection travel times to, and the reflection coefficients of, a number of earth subsurface reflecting interfaces, and utilizing existing seismic magnetic-record playback equipment including a plurality of movable reproducing heads adapted to reproduce the traces of a multiple-trace record simultaneously, and including adjustable positioning means for each head for compensating differential constant time delays between traces of recorded data due to variations in elevation, weathering travel time and the like, said method comprising adjusting each of said head-positioning means to a time-delay position equal to one of a plurality of successive two-way travel times to a corresponding plurality of successive subsurface reflecting interfaces, as shown by or assumed from a continuous velocity log, playing back a record bearing a plurality of identical magnetically recorded pulse forms perpendicularly aligned on a plurality of adjacent magnetic traces extending at least part of the way across said record, modifying the output amplitude and the polarity of each head output in accordance with the reflection coefficient of the corresponding subsurface interface which said each head is, by its delay position, assigned to simulate, summing the outputs of all of said plurality of heads into a single output signal, and recording said signal as a function of time.

3. The method of preparing a synthetic seismic record trace in accordance with measured or assumed seismic reflection coefficients and two-way travel times interpreted from a continuous velocity log and utilizing a shiftable multiple-head multiple-trace magnetic reproducer, which method comprises shifting each of said multiple heads to one of a plurality of successive delay times equal to a corresponding plurality of successive two-way travel times to a corresponding succession of earth subsurface reflecting interfaces, moving past said heads a multiple-trace pre-recorded magnetic record bearing identical pulse forms perpendicularly aligned across at least the part of said record width to be scanned by said heads, modifying the output amplitude and polarity of each of said heads in accordance with the reflection coefficient of the subsurface interface with which it corresponds, summing the output of all of said heads into a single summation signal, and recording said signal as a function of record time.

4. A method as in claim 3 wherein said pre-recorded record bears a plurality of groups of perpendicularly aligned pulse forms spaced at intervals less than the maximum record-time shift said heads are permitted to have, and wherein said head-shifting step comprises moving each head to a time position which is equal to the two-way reflection travel time of a corresponding interface minus the spacing of the pulse group to be scanned by said each head from the first-scanned pulse group of said pre-recorded record.

5. A method as in claim 3, wherein said pre-recorded record bears a first plurality of groups of pulses of a first form spaced at intervals less than the maximum record-time shift said heads are permitted to have and wherein said first plurality of pulse groups and spacings are duplicated by a second plurality of pulse groups at said spacings of a second form, and wherein said head-shifting step comprises moving each head to a position equal to the two-way seismic reflection travel time of a corresponding interface minus the spacing of the pulse group to be scanned by said each head from the first-scanned pulse group of said pre-recorded record.

References Cited in the file of this patent

UNITED STATES PATENTS

| | | |
|---|---|---|
| 2,757,357 | Peterson | July 31, 1956 |
| 2,806,545 | Schempf | Sept. 17, 1957 |
| 2,887,890 | Schardt | May 26, 1959 |
| 2,916,724 | Peterson | Dec. 8, 1959 |